(No Model.) 8 Sheets—Sheet 4.

E. HURLBURT & D. H. BENJAMIN.
STARCHING MACHINE.

No. 458,272. Patented Aug. 25, 1891.

WITNESSES.
Rich. George.
M. E. Robinson

INVENTORS.
Edward Hurlburt and
Dana H. Benjamin
By Risley & Perry
Attys (No Model.) 8 Sheets—Sheet 7.

E. HURLBURT & D. H. BENJAMIN.
STARCHING MACHINE.

No. 458,272. Patented Aug. 25, 1891.

WITNESSES.
Rich. George.
M. E. Robinson

INVENTORS.
E. Hurlburt
D. H. Benjamin
By Risley & Perry
attys

(No Model.) 8 Sheets—Sheet 8.

E. HURLBURT & D. H. BENJAMIN.
STARCHING MACHINE.

No. 458,272. Patented Aug. 25, 1891.

WITNESSES
Rich George
M. E. Robinson

INVENTORS.
E. Hurlburt, D. H. Benjamin
By Risley & Perry
attys

UNITED STATES PATENT OFFICE.

EDWARD HURLBURT AND DANA H. BENJAMIN, OF UTICA, NEW YORK.

STARCHING-MACHINE.

SPECIFICATION forming part of Letters Patent No. 458,272, dated August 25, 1891.

Application filed February 27, 1890. Serial No. 341,969. (No model.)

*To all whom it may concern:*

Be it known that we, EDWARD HURLBURT and DANA H. BENJAMIN, both of the city of Utica, in the county of Oneida and State of New York, have invented certain new and useful Improvements in Starching-Machines; and we do hereby declare that the following is a full, clear, and exact description of the invention, which will enable others skilled in the art to which it appertains to make and use the same, reference being had to the accompanying drawings, and to the letters and figures of reference marked thereon, which form part of this specification.

Our invention relates to an improvement in starching-machines.

In the drawings which accompany and form part of this specification, and in which similar letters and figures of reference refer to like parts in the several figures,
Fig. 6ª shows a side view of the part shown in Fig. 6.
Fig. 11ª shows a side elevation of the parts shown in Fig. 11 and other details relating to the mechanism for operating the paddles.
Fig. 11ᶜ shows an end view of that portion of Fig. 11ª to the left of line J F.
Fig. 14ª shows an edge view of the same, the retaining-flange at the edge being omitted.
Fig. 14ᵇ shows an end view of a paddle and cross-section of the shaft on which it is mounted.
Fig. 15 also shows the movable box, which slides in the walls of the tank, in which box the movable wringer-roller is journaled, also the gear by which the stationary wringer-roller is operated.
Fig. 18 shows at the left the face of the clutch next toward the end of the shaft and at the right the face attached to the cog-wheel opposed to that of the clutch shown on the left.

Referring more specifically to the reference-numerals marked on the drawings, 1 indicates the frame of the machine, in which is mounted a starch-tank 2. A cover 3 is provided for the tank, secured in place by pivoted buttons $3^a$ and having a slotted opening across the top, directly beneath which opening is provided a pair of wringer-rollers 4 and 5. The roller 5 is mounted in the bearings at either end in the upper part of the tank, and the roller 4 is mounted in sliding bearings, which slide in suitable slots provided for the purpose in the walls of the tank, (see Figs. 16, 20, 31, and 34,) and is operated by the swinging arms 10 and $10^a$, one at each side of the tank. The arms 10 and $10^a$ are pivoted to the tank at 11 and $11^a$, respectively, and the movable roller 4 is held against stationary roller 5 by the tension of springs 12, secured at one end to the frame and at the other to the lever-arms 10 and $10^a$, respectively. The roller 4 may be thrown out of contact with the roller 5 by means of treadle 13 and connection 14 between the treadle and lever arms 10 and $10^a$. The rollers 4 and 5 are provided with cog-gears $4^a$ and $5^a$, respectively, meshing with each other and causing the rollers to revolve simultaneously. The gears $4^a$ and $5^a$ are provided, preferably, with sharp cogs or teeth, so that they are readily meshed when thrown into contact.

Directly below the wringer-roller is provided a pair of paddles 6 and 7, mounted upon rocking shafts 8 and 9, respectively, which shafts are mounted in bearings at each end of the tank near the bottom. The shafts 8 and 9 pass through the walls of the tank and at one side of the machine have the mechanism for opening and closing the paddles connected and at the other the mechanism for moving the paddles laterally upon each other, producing a rubbing motion.

Figures 8, 9, 10, 11, 11A, 11C:
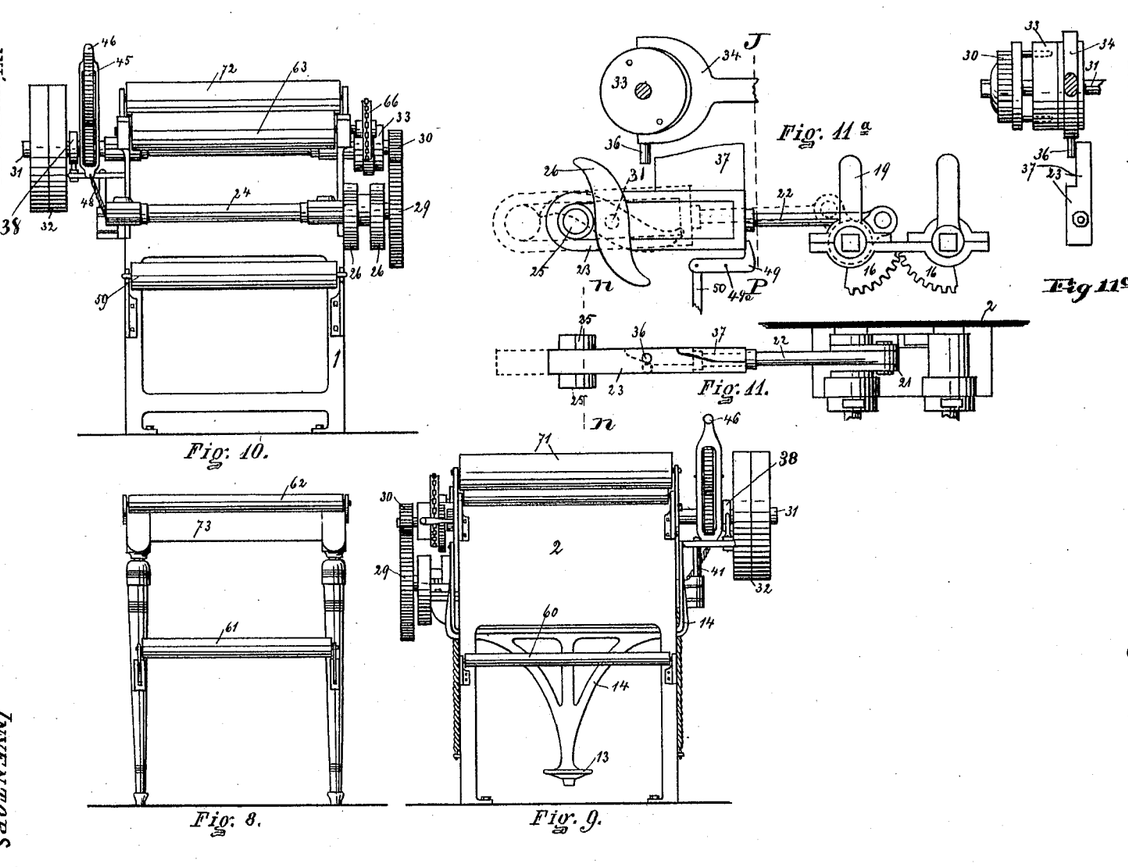
Fig. 8 shows the front end of the table of the machine—the right-hand end as shown in Fig. 1.
Fig. 9 shows the front end of the machine—that end adjacent to the feeding-table.
Fig. 10 shows the rear end of the machine—the left-hand end as shown in Fig. 1.
Fig. 11 shows the top view of the mechanism for opening and releasing the paddles and parts connecting therewith.

The mechanism for opening and closing the paddles is connected thereto as follows: One end of each paddle-shaft is square and extends outside of the tank and has mounted loosely thereon a sleeve 15, through which the square shaft may slide in its lateral movements. To this sleeve is secured or formed integral therewith a segmental cog-gear 16 and an arm 17, having an opening in its outer end. The sleeve 15 is provided with a bearing in box 18. To the outer end of the shaft is rigidly secured an arm 19, projecting parallel the arm 17, and having a pin 20 rigidly secured in the end thereof, which extends to arm 17 and passes through an opening in the end thereof. One of the sleeves 15 is provided with a pair of ears 21, in which is pivoted one end of connection-rod 22, and the other end thereof is secured to a yoke 23, which embraces the shaft 24 and carries rollers 25, adapted to be operated upon by cams 26 26, mounted upon shaft 24, on each side of yoke 23. To yoke 23 is secured one end of each of the springs 27 and 28, the opposite ends of which are secured to the frame of the machine, and are strained to draw the yoke from the position shown in dotted lines in Fig. $11^a$ to that shown in full lines in the same figure when the position of the cams will permit, and through the connecting mechanism closing the paddles with a blow. Shaft 24 is driven by a cog-gear wheel 29, mounted thereon, which is meshed by cog-gear 30, loosely mounted on the shaft 31, which shaft is the power-shaft, and may be provided with a tight and a loose band-pulley 32. The gear 30 is driven from the shaft 31, by a clutch 33 which may be of any of several forms of clutch. The movable clutch member is operated by a lever-handle 34, pivoted to the frame or tank at 35. The fork-lever 34 is provided with a pin 36, which projects so as to become engaged with plate 37 on the yoke 23.

Pin 36 and plate 37 constitute one of several forms of holding mechanism for securing the clutch in operation, so that it can be thrown out of operation only while the paddles are vertical.

Figures 23, 24:
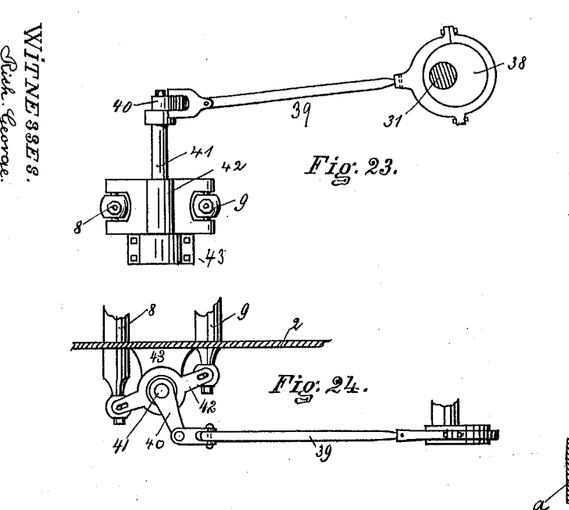
Fig. 23 shows details of mechanism for producing the lateral or rubbing movement of the paddles and is substantially the same as that shown in Fig. 6ª, except that the parts are in a different position.
Fig. 24 is a top view of the same parts shown in Fig. 23 in the same position.
Figure 25:
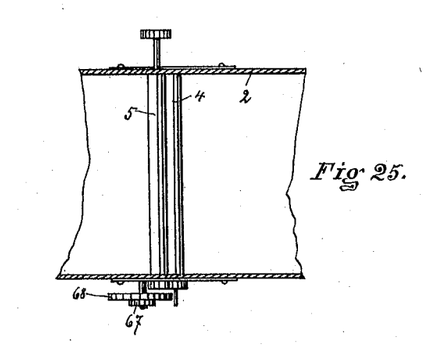
Fig. 25 is a detail view showing the wringer-rollers and adjacent and connecting parts.
Figure 26:
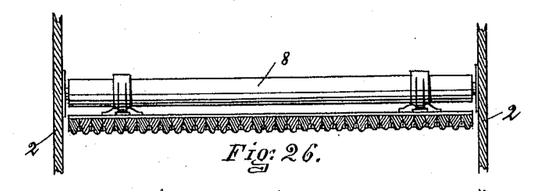
Fig. 26 shows an edge view of one of the beating-paddles, the retaining rim or flange being omitted.
Figure 27:
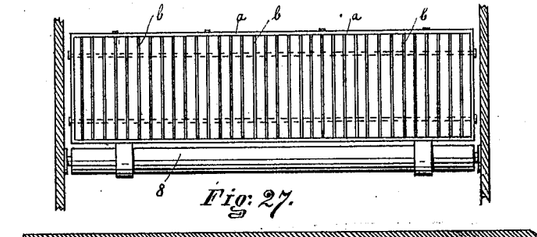
Fig. 27 shows a face view of one of the beating-paddles.
Figures 28, 33:
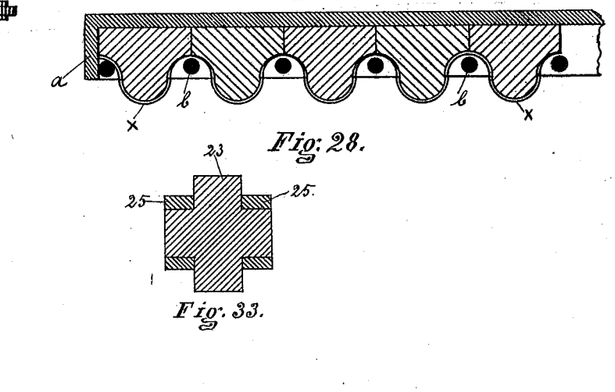
Fig. 28 is an enlarged longitudinal sectional view of a part of a paddle and designed to show the construction thereof.
Fig. 33 shows a section on line $n\, n$, Fig. 11.

The mechanism for producing the lateral or rubbing movement of the paddles consists of an eccentric 38, mounted upon shaft 31, to which is connected a connecting-rod 39, which connects at the opposite end to lever-arm 40 upon the upper end of vertical rocking shaft 41. Shaft 41 is mounted in suitable bearing 43, secured to the frame or tank. To shaft 41 is secured a cross-piece 42, to the ends of which cross-piece are connected by an ordinary swivel-joint and slotted connections the ends of shafts 8 and 9, carrying the paddles, the swivel being provided to permit of the opening and closing motion of the paddles and the rocking of shaft 41. The construction will be readily understood from Figs. 23 and 24. As the eccentric 38 is made to revolve, it thrusts and draws on the connecting-rod 39, and by means of the rocking shaft alternately forces in and draws out the shafts 8 and 9, on which the paddles are mounted, as will be readily understood from the several positions shown in dotted lines in Fig. 6.

For operating the wringer-rollers we provide on one end of stationary wringer-roll 5 a gear-wheel 44, which is adapted to be meshed by gear 45, mounted upon swinging arm 46, pivoted on shaft 31, the gear 45 meshing with and being driven by gear 47 upon shaft 31. The end of arm 46 projects beyond its pivotal point, and has a spring 48 secured to it and the frame and strained to hold gear 45 out of engagement with gear 44 in the position shown in Fig. 5.

Figure 1:
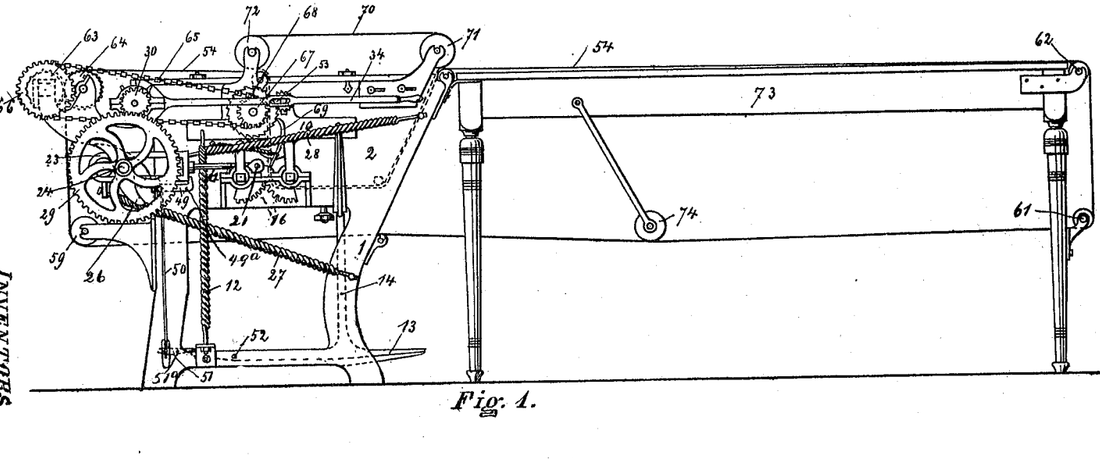
Figure 1 shows the left-hand side elevation of the machine.
Figure 2:
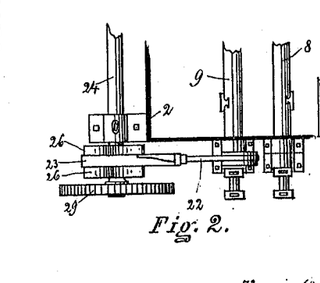
Fig. 2 shows a top view of a portion of the mechanism for operating the paddles.
Figures 3, 4:
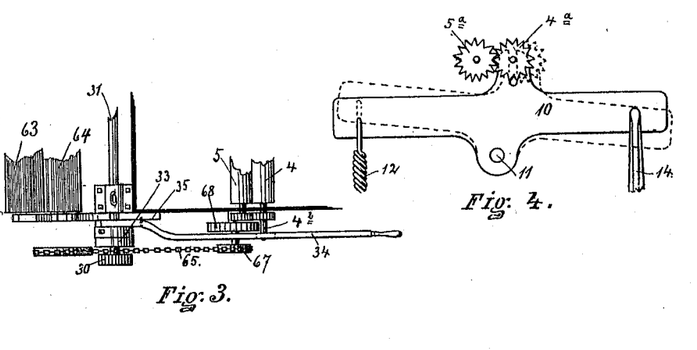
Fig. 3 shows a top view of a portion of the mechanism for operating the wringer-rollers and carrier.
Fig. 4 shows one of the pivoted levers used in operating the wringer-rollers.
Figure 17:
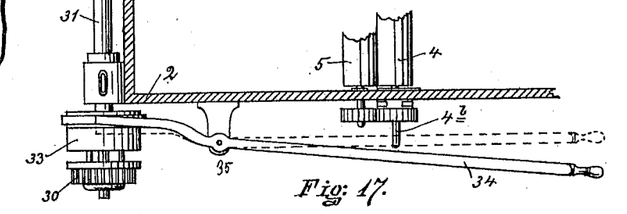
Fig. 17 is a detail view, on a larger scale, of the same part shown in Fig. 3 and intended to show the operation of the clutch for transmitting power to the paddles and the connection and relation between it and the wringer-rollers.
Figure 18:
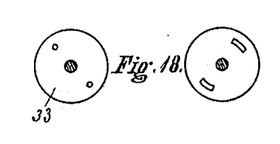
Figures 19, 20, 21, 22:
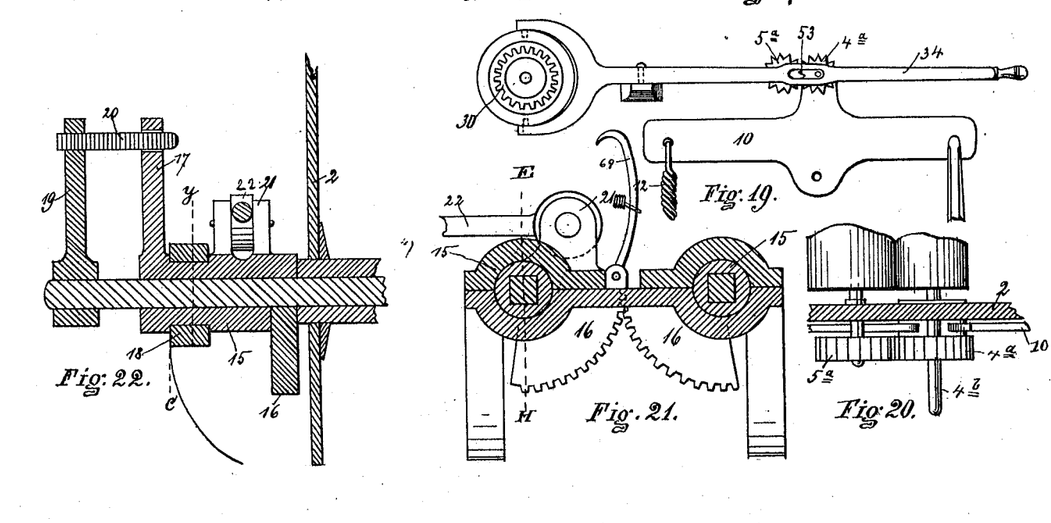
Fig. 19 shows a side view of the parts shown in Fig. 17 in connection with one of the pivoted levers for operating the movable wringer-roller.
Fig. 20 shows on a larger scale a top view of the gears between the wringer-rollers and also the box in which the movable wringer-roller is mounted and the projection on the movable wringer-roller which engages the lever-handle for operating the clutch.
Fig. 21 is a detail view, partially in section, of the bearings, sleeves, and segmental gear for operating the paddles and is taken substantially on a line with y c of Fig. 22.
Fig. 22 shows the bearing and adjacent parts of one of the paddles taken substantially on a line with E H of Fig. 21.

For throwing the paddles slightly apart independent of the regular operation of the machine, we provide a bell-crank lever 49, Figs. 1 and 11$^a$, pivoted at 49$^a$ to the frame, one end of which is adapted to act against the end of the yoke 23, and to the other end is attached rod 50, which extends to and is connected to one end of lever 51, pivoted at 51$^a$ to the frame, the other end of which is engaged by the end of treadle-lever 13, which treadle-lever is pivoted in the frame at 52. Lever-handle 34, for operating the clutch which drives the paddles, has an opening 53, Fig. 19, adapted to receive the projecting end 4$^b$, Figs. 17 and 20, of the movable wringer-roller 4 when the movable wringer-roller is in contact with the stationary wringer-roller. The end 4$^b$ of wringer-roller 4 projects to such a distance and is so arranged with reference to handle 34 that when the wringer-rollers are open or separated the handle cannot be operated to throw the clutch into gear and the paddles into motion by reason of the projecting end 4$^b$ engaging the side of the lever, and when the paddles are in motion the lever 34 will be in the position shown in dotted lines in Fig. 17, in which position it engages projection 4$^b$ of the wringer-roller, and in that position the wringer-roller cannot be opened. This arrangement obviates all danger of accident by splashing the hot starch out of the tank through the opening in the cover over the paddles.

Figures 5, 6, 6A, 7:
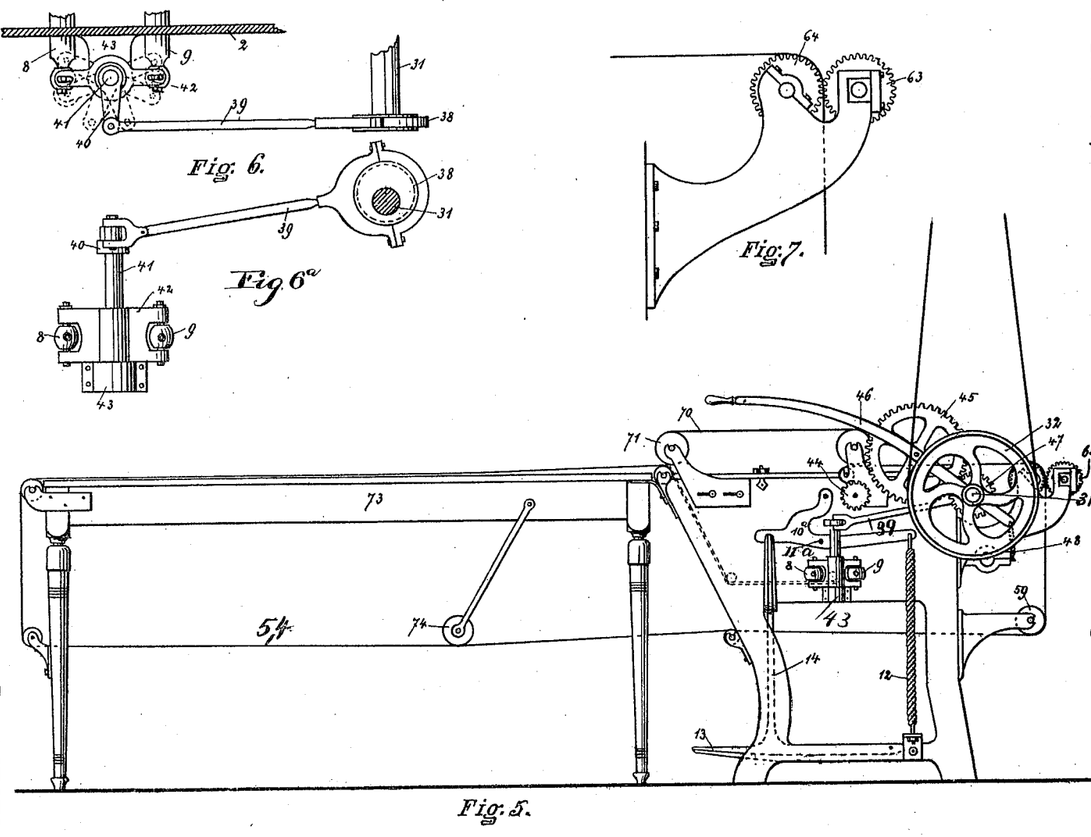
Fig. 5 shows the right-hand-side elevation of the machine.
Fig. 6 shows a top view of details of mechanism for producing the lateral or rubbing movement of the paddles.
Fig. 7 shows details relating to the rollers for driving the carrier.
Figure 12:
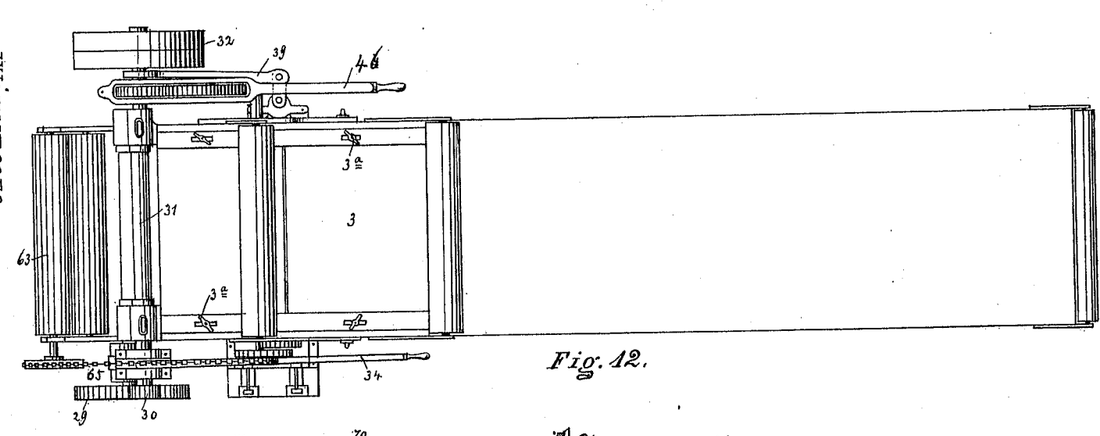
Fig. 12 is a top or plan view of the machine.
Figure 29:
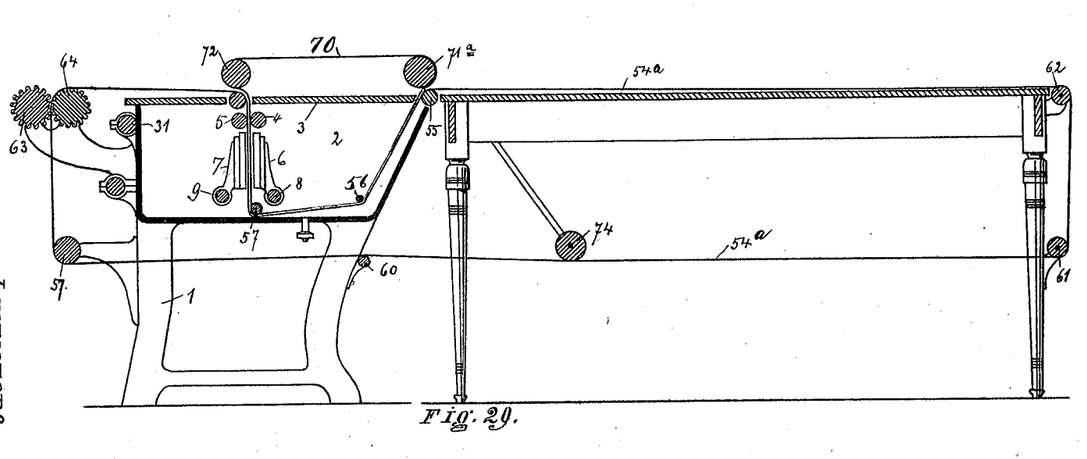
Fig. 29 shows the longitudinal section of a machine having a series of bands forming the carrier-belt.
Figure 30:
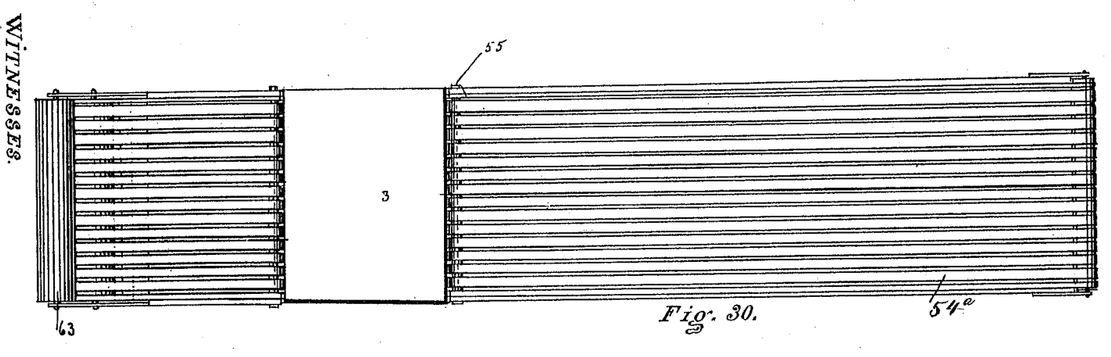
Fig. 30 shows a top or plan view of a machine having the carrier-belt formed of a series of narrow bands.
Figure 31:
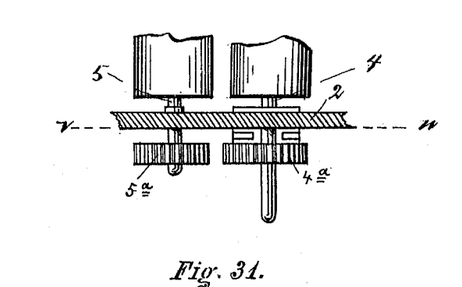
Fig. 31 shows a portion of the walls of the tank, the shafts on which the wringer-rollers are mounted, and the cog-gears thereon, and the sliding bearing in its open position, the figure being the same as Fig. 20, showing the parts in their open instead of closed position.
Figure 32:
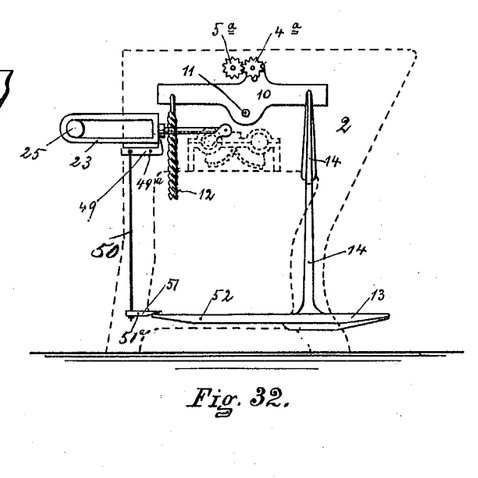
Fig. 32 shows the treadle and its connections for operating the wringer-rollers and separating the paddles and its connections with the parts.
Figure 34:
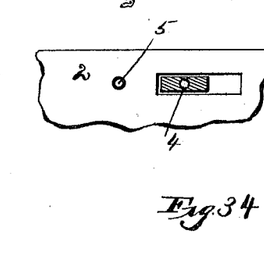
Fig. 34 shows a broken-out portion of the side of the tank and a section of the movable block in which the movable wringer-roll is mounted, and also shows a slot in the tank, which permits the movement of the wringer-roller. Said section is taken on the line V W of Fig. 31.

In connection with the machine is provided a carrier 54, which may be a canvas or cloth web, as shown in Figs. 1, 5, and 12, or a series of narrow belts or bands, as shown at 54$^a$ in Figs. 29 and 30. The carrier runs on the guide-roll 55 on the edge of the tank, roller 56 near the bottom of the tank, 57 in the bottom of the tank below the central line between the paddles, 58 at the opening in the top of the tank, and other guide-rollers 59, 60, 61, and 62 convey the carrier back to the point of entering the tank.

63 and 64 are the pair of fluted driving-rollers for the carrier, between which it passes, and which are driven by link belt 65, passing around sprocket-wheel 66, connected with roller 63 and sprocket-wheel 67. Sprocket-wheel 67 is concentric with and secured to ratchet-wheel 68 and mounted upon a bearing projecting from the tank. Ratchet-wheel 68 is engaged and driven by pawl 69, pivoted at its opposite end to gear-sector 16 on the shaft of one of the paddles, the pawl being held in engagement with the ratchet-wheel by a spring provided for that purpose.

70 is a contact-belt which passes around guide-rollers 71 and 72 and with carrier 54 around rollers 56 and 57.

Under the feeding-table 73, which of course may be dispensed with, is mounted on swinging arms a tension or stretch roller 74.

Figures 13, 14, 14A, 14B:
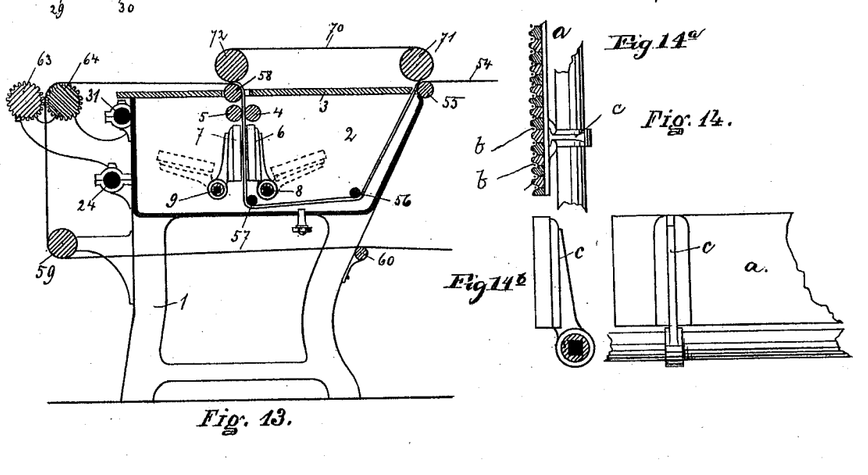
Fig. 13 is a longitudinal vertical section of the machine close to and parallel with one of the sides of the tank.
Fig. 14 shows a back view of a portion of a paddle.
Figures 15, 16:
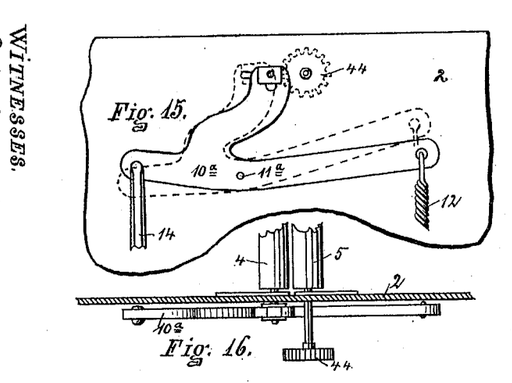
Fig. 15 shows a pivoted lever for operating the movable wringer-roller, being the same lever as shown in Fig. 5 and the mate to the lever shown in Fig. 4. These levers are substantially the same, being pivoted the same and performing the same office, but for convenience and advantage of construction are made slightly different in outline.
Fig. 16 is a detail view showing a top view of the parts shown in Fig. 15.

The paddles 6 and 7 are constructed, preferably, with a sheet-metal back A, (Figs. 14, 14$^a$, 14$^b$, 26, 27, and 28,) having an edge all around and containing a ribbed surface formed of independent wooden blocks. Along the depressions of the ribbed surface from the one side to the other extend wire rods $b$, which secure a canvas cover, (indicated by $x$ upon the faces of the paddles.) The paddle is secured on its rocking shaft by an arm $c$, flanged or dovetailed in cross-section, engaging suitable cleats on the back of the paddle.

The operation of the machine is substantially as follows: The tank being filled with starching material to such a depth that the paddles will dip beneath its surface when open and the machine being put in motion, the paddles will be moved in their lateral movement continuously, and when the clutch 33 is brought into action the paddles are opened by the action of cams 26 and connecting parts until the points of the cams pass the rollers 25, against which they act, when the paddles are brought together with a blow by the action of springs 27 and 28, driving the starch through the carrier and contact-belt into the pores of the goods between the carrier and belt. The goods to be operated on are placed upon the carrier-belt 54 as it travels along table 73, and as they reach the machine they pass between the carrier 54 and contact-belt 70 and travel with them through the starch-tank and between the paddles and wringer-rollers and out of the tank and may be removed from the carrier at the rear end of the machine. The excess of starch, if any, is removed from the goods by the wringer-rollers as they pass between them. The carrier is moved ahead with each stroke of the paddles by means of pawl 69 and the connecting mechanism. The carrier may be made to move independently of the paddles or continuously by bringing down handle 46, and thus throwing gear 45 into gear 44, or the machine may be used with the carrier-belts and feeding-table removed. Then by depressing the treadle 13 the paddles and wringer-rollers are separated, and the goods, being properly folded, may be inserted through the opening in the top of the tank between the paddles, and upon releasing treadle 13 the wringer-rollers will close, holding it in position for the paddles to act on that portion to be starched. The paddles are then set in motion by throwing the clutch 33 into action. When the paddles have beaten the goods a sufficient number of times to introduce the starch into the goods, they may be removed from the machine and the excess of starch removed by throwing gear-wheel 45 into gear 44 by means of lever-handle 46.

The object of the pin 36 and the plate 37 on the yoke is to prevent the operation of the paddles being stopped at any other time than when they are in their closed position, thus avoiding the danger of accident by splashing of hot starch contained in the tank, and as a further safeguard we provide the connection between the movable wringer-roller and the clutch hereinbefore described, whereby when the paddles are in operation or in a position liable to splash the hot starch the wringer-rollers cannot be in any other position than closed.

What we claim as new, and desire to secure by Letters Patent, is—

1. The combination, in a starching-machine, of a tank, a pair of simultaneously opening and closing paddles mounted on rocking shafts adapted to close together and open apart from a substantially vertical to a substantially horizontal plane, springs operating to bring the paddles into closed position with a blow, and mechanism for opening the paddles, substantially as set forth.

2. The combination, in a starching-machine, of a tank, a pair of paddles mounted on rocking shafts in the tank adapted to close together, meshing segmental gears on the paddle-shafts, a cam for opening the paddles, and a spring for closing the paddles together with a blow when released, substantially as set forth.

3. The combination, in a starching-machine, of the tank, a pair of paddles within the tank mounted upon rocking shafts and adapted to close together, and a carrier passing through the tank between the paddles, substantially as set forth.

4. The combination, in a starching-machine, of a tank, a pair of paddles mounted in the tank on rocking shafts adapted to close together, a pair of wringer-rollers mounted in line with the faces of the paddles in closed position, and a carrier and a contact-belt passing together through the tank and between the paddles and wringer-rollers, substantially as set forth.

5. The combination, in a starching-machine, of a tank, a pair of simultaneously opening and closing paddles mounted on rocking shafts within the tank and constructed and adapted to close together in a substantially vertical plane and open apart into substantially horizontal plane, a spring to bring the paddles into closed position with a blow, a cam for opening and releasing the paddles, and a pair of wringer-rollers, substantially as set forth.

6. The combination, in a starching-machine, of a tank, a pair of simultaneously opening and closing paddles mounted on rocking shafts within the tank, having their faces adapted to swing into contact, a cam for opening and releasing the paddles, a spring adapted to bring the paddles together with a blow, and a cam and connecting mechanism for producing a lateral or rubbing movement of the paddles with reference to each other, substantially as set forth.

7. The combination, with a starching-machine, of a tank, a pair of beating-paddles mounted therein adapted to have their faces swing into contact with each other, a carrier passing between the paddles, said carrier being composed of a series of narrow bands, and guide-rollers for the carrier, substantially as set forth.

8. The combination, in a starching-machine, of a tank, a pair of paddles mounted in the tank adapted to swing into contact with each other, mechanism for opening the paddles, a spring for closing the paddles, a carrier, and a contact-belt, both passing together between the paddles, substantially as set forth.

9. The combination, in a starching-machine, of a tank, a pair of paddles mounted therein adapted to swing into contact, mechanism for operating the paddles, a carrier composed of a series of narrow bands and a contact-belt running together with the carrier between the paddles, and guide-rollers for the carrier and contact-belt, substantially as set forth.

10. The combination, in a starching-machine, of a tank, a pair of opening and closing paddles mounted on the rocking shafts in the tank, a cam for opening the paddles, a spring for closing the paddles, a clutch between the driving-shaft and the cam, and the holding mechanism for holding the clutch in operation while the paddles are in open position, substantially as set forth.

11. The combination, in a starching-machine, of a tank, a pair of opening and closing paddles mounted in the tank, a pair of wringer-rollers mounted in line with the faces of the paddles in closed position, one of the wringer-rollers being mounted in movable bearings, mechanism for operating the paddles, and connecting mechanism between the mechanism for operating the paddles and the movable wringer-roller, whereby the wringer-rollers cannot be opened when the paddles are in operation and open, substantially as set forth.

12. The combination, in a starching-machine, of a tank, a pair of beating-paddles mounted in the tank adapted to have their faces brought into contact, a cam for opening and releasing the paddles, and a spring for closing the paddles together with a blow after being released by the cam, substantially as set forth.

13. The combination, with the tank, of the paddles mounted on rocking shafts therein, the rocking lever connecting with the paddles, the eccentric or crank for operating the rocking lever to give the latter movement to the paddles, the segmental gears connecting with the paddles, a cam for opening the paddles, the connection between the cam and paddles, and the spring for closing the paddles, substantially as set forth.

14. The combination, with the tank, the opening and closing paddles in the tank, the wringer-rollers mounted in the tank in line with the paddles in closed position, one of the wringer-rollers being mounted in movable bearings, and the cam and connecting mechanism for opening the paddles, of the spring for closing the paddles, the clutch for transmitting motion to the paddles, and the connections between the clutch and paddles and clutch and movable wringer-roller, whereby the wringer-rollers cannot be separated while the paddles are in operation or the operation of the paddles stopped while in open position, substantially as set forth.

15. In a starching-machine, the combination, with a tank, of a pair of beating-paddles, the carrier passing between the paddles, guide-rollers for the carrier, and propelling-rollers for the carrier, having corrugated faces, substantially as set forth.

16. The combination of the tank, the beating-paddles, the springs for closing the paddles together, the pivoted lever for throwing the paddles apart, the connecting-rod and crank between the lever and the paddle-shaft, and the treadle connecting with the pivotal lever, whereby the paddles may be separated independent of the regular operation of the machine, substantially as set forth.

17. The combination, in a starching-machine, of the tank, the beating-paddles mounted in the tank, adapted to swing together and capable of a lateral movement, the sleeve upon the paddle-shaft and in which the shaft has lateral movement, the sleeve having a radial projecting arm, a projecting arm rigidly secured on the outer end of the paddle-shaft and extending parallel with the arm of the sleeve, and a cross-pin between the two projecting arms rigidly secured in one and adapted to slide through an opening in the other, whereby the shaft is firmly secured from rotation in the sleeve and the lateral reciprocating motion of the paddle-shafts permitted, substantially as set forth.

In witness whereof we have affixed our signatures in presence of two witnesses.

EDWARD HURLBURT.
DANA H. BENJAMIN.

Witnesses:
EMMETT J. BALL,
THOS. W. ROYCE.